United States Patent
Dorfman et al.

(10) Patent No.: US 9,255,208 B2
(45) Date of Patent: Feb. 9, 2016

(54) INK JETTABLE SILVER/SILVER CHLORIDE COMPOSITIONS

(75) Inventors: Jay Robert Dorfman, Durham, NC (US); John D. Summers, Chapel Hill, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 719 days.

(21) Appl. No.: 13/383,491

(22) PCT Filed: Jun. 11, 2010

(86) PCT No.: PCT/US2010/038300
§ 371 (c)(1),
(2), (4) Date: Jan. 11, 2012

(87) PCT Pub. No.: WO2010/144790
PCT Pub. Date: Dec. 16, 2010

(65) Prior Publication Data
US 2012/0138871 A1    Jun. 7, 2012

Related U.S. Application Data

(60) Provisional application No. 61/186,512, filed on Jun. 12, 2009.

(51) Int. Cl.
H01B 1/02  (2006.01)
C09D 11/30  (2014.01)
C09D 11/52  (2014.01)

(52) U.S. Cl.
CPC ................ *C09D 11/30* (2013.01); *C09D 11/52* (2013.01)

(58) Field of Classification Search
USPC .......................................... 252/511, 512, 514
See application file for complete search history.

(56) References Cited

U.S. PATENT DOCUMENTS

| 5,051,208 A |   | 9/1991  | Bowns et al. |
| 5,565,143 A |   | 10/1996 | Chan |
| 5,851,438 A | * | 12/1998 | Chan ............................. 252/514 |
| 5,855,820 A | * | 1/1999  | Chan et al. .................... 252/511 |
| 5,855,850 A |   | 1/1999  | Sittler |

FOREIGN PATENT DOCUMENTS

WO    9741568 A1    11/1997

OTHER PUBLICATIONS

International Search Report of corresponding PCT case: European Patent Office in Rijswijk, NL, Ellrich, Klaus, Authorized Officer Aug. 19, 2010.

* cited by examiner

*Primary Examiner* — Monique Peets

(57) ABSTRACT

The present invention uses a silver/silver chloride composition and ink jet technology in the art of digital printing, especially for use in blood glucose sensors.

10 Claims, No Drawings

INK JETTABLE SILVER/SILVER CHLORIDE COMPOSITIONS

FIELD OF THE INVENTION

Embodiments of the invention relate to an ink jettable silver/silver chloride compositions for use in ink jet printing projects.

TECHNICAL BACKGROUND OF THE INVENTION

There is a need for suitable compositions, for carrying out "printed electronics." "Printable electronics" is the term for newer technology for printing on common structures such as plastics or textile.

"Printed electronics" is the term for a relatively new technology that defines the printing of electronics on common substrates such as paper, plastic, and textile using standard printing processes. This printing preferably utilizes common press equipment in the graphics arts industry, such as screen printing, ink jetting, flexography, gravure, and offset lithography. Instead of printing with graphic arts inks on graphic arts substrates, families of electrically functional electronic inks are used to print on active devices, such as conductor traces. Printed electronics is expected to facilitate widespread and very low-cost electronics useful for applications not typically associated with conventional (i.e., silicon-based) electronics, such as flexible displays, smart labels, animated posters, and active clothing.

The present invention addresses the desire to use digital printing, specifically ink jet technology, for use in a next generation of glucose sensors. To accomplish this, a silver/silver chloride ink formulation that is capable of being ink jetted is needed. Desirable properties of such inks include low temperature curing (80° C. is desired), maintaining conductivity of the cured ink, and flexibility to withstand bending associated with a reel-to-reel process.

SUMMARY OF THE INVENTION

Disclosed is an ink jettable composition comprising:
(a) sub-micron silver chloride with a flake geometry;
(b) sub-micron silver with a flake geometry
(c) polymeric binder
(d) humectant(s), to aid in ink jetting; and
(e) a solvent capable of dispersing silver/silver chloride, and dissolving the polymeric binder.

The ink jettable composition described herein allows digital printing of silver/silver chloride inks, with the inventive inks having the properties of low temperature curing at 80° C. or less, maintaining conductivity of the cured ink, and flexibility to withstand bending associated with a reel-to-reel process.

DETAILED DESCRIPTION OF THE INVENTION

The present invention allows printing of materials for applications such as blood glucose sensors, iontophoretic applications, and other applications. These printed materials are typically prepared using screen printing of a polymer thick film Ag/AgCl paste. These conventional compositions are unsuitable for ink jet uses due to the large particle size of the silver/silver chloride dispersed in such pastes and the undesirably high viscosity of the paste itself.

Printing can be accomplished with ink jettable compositions comprising the following ingredients: Sub-micron silver/silver chloride with a flake geometry. The term "flake geometry" means a silver/silver chloride particle whose predominant shape is flake as determined by scanning electron microscopy. Non-flake particles (e.g., irregularly shaped or spherical) are not meant to be within the scope of the invention. The sub-micron silver/silver chloride having a particle size and a flake geometry in accordance with the invention is obtained cryogenic milling methods. The term "submicron" means less than one micron. In embodiments of the invention, the submicron silver-silver chloride particle size is d50=0.6 microns. A polymeric binder is used, preferably a binder that possesses a low Tg and at least some polar groups such as hydroxy groups. One specific example includes the family of phenoxy resins. Another example includes copolymers containing vinyl alcohol such as poly (vinyl butyral-co-polyvinyl alcohol). Humectants are used to aid the ink jetting process. Specific examples of humectants include ethylene glycol; and a solvent capable of dispersing the Ag—AgCl and dissolving the polymeric binder. Dibasic esters are a class of preferred solvents.

The polymeric binder is present in the overall composition at about 1 to 4 wt %, the silver/silver chloride is present at a concentration ranging from about 15% to 25%, and the humectant is present at a range of about 0.1% to 1%. The remainder of the ink composition is solvent.

The ratio of silver/silver chloride is a function of the particular specified application, and the ink jettable compositions in accordance with the invention may be made with any selected silver/silver chloride ratio. In particular, 68/32 wt % silver/silver chloride is often specified for blood glucose sensors, 30/70 wt % silver/silver chloride is often specified for iontophoretic applications, and 80/20 wt % silver/silver chloride may be used in other applications. In embodiments of the invention the range of silver/silver chloride is from 90/10 wt % silver/silver chloride to 10/90 wt % silver/silver chloride.

EXAMPLES

Ink Jettable Silver/Silver Chloride Compositions

Example 1

| Ingredients | Amount (g) |
| --- | --- |
| Bisphenol-A based phenoxy resin | 2.3 |
| DBE-3 (dimethyl adipate + dimethyl glutarate) | 74.2 |
| Ethylene glycol | 0.5 |
| Submicron silver-silver chloride (flake geometry) | 23.0 |

A single neck 250 ml round bottom flask was fitted with a nitrogen inlet. The DBE-3 and the bisphenol-A based phenoxy resin were added to the flask. A magnetic stirrer was added to the mixture and the flask was suspended above a hot plate/magnetic stirrer. The mixture was allowed to stir at room temperature for approximately two hours, during which time the resin dissolved in the solvent. After this, the ethylene glycol was added to the polymer solution with stirring. The resulting solution was transferred to a suitably sized plastic container. The submicron silver-silver chloride (d50=0.6 microns) was then added to the solution with stirring. The plastic container was then sealed and the crude ink was agitated in a Thinky mixer for approximately two minutes to disperse the silver-silver chloride. The ink was then subjected to ultrasonic treatment for five minutes to further disperse and suspend the silver-silver chloride particulates in the solvent medium. After this, the ink was filtered through a ten micron coarse glass frit funnel with vacuum assist. The ink was then transferred to a disposable plastic syringe and filtered through a five micron disk filter composed of a glass filtering medium to yield the final product. The viscosity of the ink was determined to be 17 cps at 25° C.

Conductive traces were prepared by casting a controlled portion of the ink onto various substrates, including alumina and Mylar® polyester film. Kapton® tape was used as a guide to form thin conductive traces of the silver/silver chloride ink. The castings were dried on a hot plate at 40° C. After the drying step, the Kapton® tape was removed to reveal the consolidated electrically isolated conductive traces adhered to the chosen substrate. The traces were then dried at 80° C. for 10 minutes, 100° C. for 10 minutes, and 120° C. for 10 minutes. The resistivity of the traces at each cure condition on alumina was determined to be 1.3 ohm/square/mil, 1.1 ohm/square/mil, and 0.79 ohm/square/mil respectively.

Example 2

| Ingredients | Amount (g) |
| --- | --- |
| Poly(vinyl butyral-co-vinyl alcohol) | 2.3 |
| DBE-3 (dimethyl adipate + dimethyl glutarate) | 74.2 |
| Ethylene glycol | 0.5 |
| Submicron silver-silver chloride (flake geometry) | 23.0 |

A single neck 250 ml round bottom flask was fitted with a nitrogen inlet. The DBE-3 and the poly (vinyl butyral-co-vinyl alcohol) resin were added to the flask. A magnetic stirrer was added to the mixture and the flask was suspended above a hot plate/magnetic stirrer. The mixture was allowed to stir at room temperature for approximately three hours, during which time the resin dissolved in the solvent. After this, the ethylene glycol was added to the polymer solution with stirring. The resulting solution was transferred to a suitably sized plastic container. The submicron silver-silver chloride (d50=0.6 microns) was then added to the solution with stirring. The plastic container was then sealed and the crude ink was agitated in a Thinky mixer for approximately two minutes to disperse the silver-silver chloride. The ink was then subjected to ultrasonic treatment for five minutes to further disperse and suspend the silver-silver chloride particulates in the solvent medium. After this, the ink was filtered through a ten micron coarse glass frit funnel with vacuum assist. The ink was then transferred to a disposable plastic syringe and filtered through a five micron disk filter composed of a glass filtering medium to yield the final product. The viscosity of the ink was determined to be 17 cps at 25° C.

Conductive traces were prepared by casting a controlled portion of the ink onto various substrates, including alumina and Mylar® polyester film. Kapton® tape was used as a guide to form thin conductive traces of the silver/silver chloride ink. The castings were dried on a hot plate at 40° C. After the drying step, the Kapton® tape was removed to reveal the consolidated electrically isolated conductive traces adhered to the chosen substrate. The traces were then dried at 80° C. for 10 minutes, 100° C. for 10 minutes, and 120° C. for 10 minutes. The resistivity of the traces at each cure condition on alumina was determined to be 12.4 ohm/square/mil, 1.3 ohm/square/mil, and 0.35 ohm/square/mil respectively.

Example 3

| Ingredients | Amount (g) |
| --- | --- |
| Fluorinated polyimide (6FDA-TFMB-6FAP) | 2.3 |
| DBE-3 (dimethyl adipate + dimethyl glutarate) | 74.2 |
| Ethylene glycol | 0.5 |
| Submicron silver-silver chloride (flake geometry) | 23.0 |

A single neck 250 ml round bottom flask was fitted with a nitrogen inlet. The DBE-3 and the fluorinated polyimide resin were added to the flask. A magnetic stirrer was added to the mixture and the flask was suspended above a hot plate/magnetic stirrer. The mixture was allowed to stir at room temperature for approximately three hours, during which time the resin dissolved in the solvent. After this, the ethylene glycol was added to the polymer solution with stirring. The resulting solution was transferred to a suitably sized plastic container. The submicron silver-silver chloride (d50=0.6 microns) was then added to the solution with stirring. The plastic container was then sealed and the crude ink was agitated in a Thinky mixer for approximately two minutes to disperse the silver-silver chloride. The ink was then subjected to ultrasonic treatment for five minutes to further disperse and suspend the silver-silver chloride particulates in the solvent medium. After this, the ink was filtered through a ten micron coarse glass frit funnel with vacuum assist. The ink was then transferred to a disposable plastic syringe and filtered through a five micron disk filter composed of a glass filtering medium to yield the final product. The viscosity of the ink was determined to be 20 cps at 25° C.

Conductive traces were prepared by casting a controlled portion of the ink onto various substrates, including alumina and Mylar® polyester film. Kapton® tape was used as a guide to form thin conductive traces of the silver/silver chloride ink. The castings were dried on a hot plate at 40° C. After the drying step, the Kapton® tape was removed to reveal the consolidated electrically isolated conductive traces adhered to the chosen substrate. The traces were then dried at 80° C. for 10 minutes, 100° C. for 10 minutes, and 120° C. for 10 minutes. The resistivity of the traces at each cure condition on alumina was determined to be 1.7 ohm/square/mil, 0.83 ohm/square/mil, and 0.52 ohm/square/mil respectively.

What is claimed is:
1. An ink jettable composition consisting of:
   (i) a resulting solution consisting of sub-micron silver/silver chloride particles having a flake geometry polymeric binder; and a solvent capable of dispersing silver chloride and dissolving the polymeric binder wherein the polymeric binder is dissolved in the solvent; and
   (ii) humectant to aid in ink jetting.
2. The ink jettable composition of claim 1 wherein the polymeric binder is present in the overall composition at about 1 to 4 wt. percent.
3. The ink jettable composition of claim 1 wherein the total silver/silver chloride is present at a concentration ranging from about 15% to 25%.
4. The ink jettable composition of claim 1 wherein the humectant is ethylene glycol.
5. The ink jettable composition of claim 1 wherein the humectant is present at a range of about 0.1% to 1%.

6. The ink jettable composition of claim 1 wherein the solvent is a dibasic acid.

7. The ink jettable composition of claim 1 wherein the silver/silver chloride ratio is 68/32 wt %.

8. The ink jettable composition of claim 1 wherein the silver/silver chloride ratio is 80/20 wt %.

9. The ink jettable composition of claim 1 wherein the silver/silver chloride ratio is 30/70 wt %.

10. The ink jettable composition of claim 1 wherein the silver/silver chloride ratio is from 90/10 to 10/90 wt %.

\* \* \* \* \*